United States Patent [19]

Kliman

[11] 4,349,245

[45] Sep. 14, 1982

[54] MODULAR NATURAL LIGHTING SYSTEM

[75] Inventor: Arthur W. Kliman, Beverly, Mass.

[73] Assignee: Baird Corporation, Bedford, Mass.

[21] Appl. No.: 229,633

[22] Filed: Jan. 29, 1981

[51] Int. Cl.³ .............................................. G02B 17/00
[52] U.S. Cl. ..................................... 350/264; 126/425
[58] Field of Search ................ 350/258, 264; 126/424, 126/425

[56] References Cited

U.S. PATENT DOCUMENTS 1,632,254  6/1927  Vinogradov ..................... 350/264 X
2,022,144  11/1935  Nicolson ......................... 350/264 X
2,646,720  7/1953  Poliansky ......................... 350/264 X Primary Examiner—Richard A. Wintercorn
Attorney, Agent, or Firm—Morse, Altman, Oates & Dacey

[57] ABSTRACT

A modular natural lighting system having a microprocessor controlled heliostat which collects the sun's rays. The collected rays are directed towards a dielectric mirror that reflects visible solar radiation through an aperture in the roof of a building. The reflected radiation is directed by a distribution system towards a plurality of output stations positioned within the building for natural illumination of selected internal areas.

10 Claims, 10 Drawing Figures

MODULAR NATURAL LIGHTING SYSTEM

BACKGROUND OF THE INVENTION

1. Field of the Invention

The present invention relates generally to lighting systems and, more particularly, is directed towards a lighting system for providing natural light to building interiors.

2. The Prior Art

Historically, the role of providing natural lighting to and throughout a building has been one of the most influential factors in the design and construction of the building. Daylight and sunlight are characterized by constant change, the quality and quantity of the light changing with the seasons, with the weather, and throughout the day from daybreak until sunset. It is known that the path of the sun varies with the time of the year, as well as with the altitude and the azimuth of the sum and with the time of day. Thus, in any given place, a building may be seen under many different kinds of lighting, while its orientation will give it a special relationship to the sun. In contrast to natural light, artificial light strives to give uniform illumination by maintaining a constant intensity with a particular spectral distribution. The addition of supplemental natural light to artificial light, with its vitality and ever-changing state, provides the environment with an aesthetic appearance.

Prior natural lighting systems have suffered from transmission losses of such magnitude as to render them uneconomical. The transmission losses of the prior natural lighting systems have been particularly severe when illumination in the deep zone of a structure has been required.

SUMMARY OF THE INVENTION

It is a principal object of the present invention to provide a natural lighting system for illuminating interior areas of a building that minimizes transmission losses, particularly when illuminating deep interior areas of buildings.

It is another object of the present invention to provide a natural lighting system that is modular in design and hence is easily adaptable to new and existing structures.

It is a further object of the present invention to provide a natural lighting system that reflects only the visible solar radiation so as to minimize the burden on the cooling system of the building, being thus energy-efficient.

It is yet a further object of the present invention to provide a natural lighting system with a solar cell so as to utilize the infrared portion of the solar radiation not reflected by the system to provide an optional electric power source.

In general, the modular natural lighting system of the present invention is characterized by a microprocessor controlled heliostat tracker structure that is equatorially mounted on the roof of a building for collection of the sun's rays. A dielectric mirror, which receives the sun's rays reflected from the heliostat structure, reflects only the visible radiation thereof through an aperture formed in the roof of the building. A distributor structure, operatively mounted below the aperture formed in the roof, receives the reflected visible solar radiation and reflects selective portions thereof to a plurality of reflectors mounted throughout the building. The reflectors reflect the selective portions to a plurality of output stations which provide natural illumination to selected areas of the building.

BRIEF DESCRIPTION OF THE DRAWINGS

For a fuller understanding of the nature and objects of the present invention, reference is made to the following specification, which is to be read in reference to the accompanying drawings, wherein.

DETAILED DESCRIPTION OF THE PREFERRED EMBODIMENT

Figure 1:
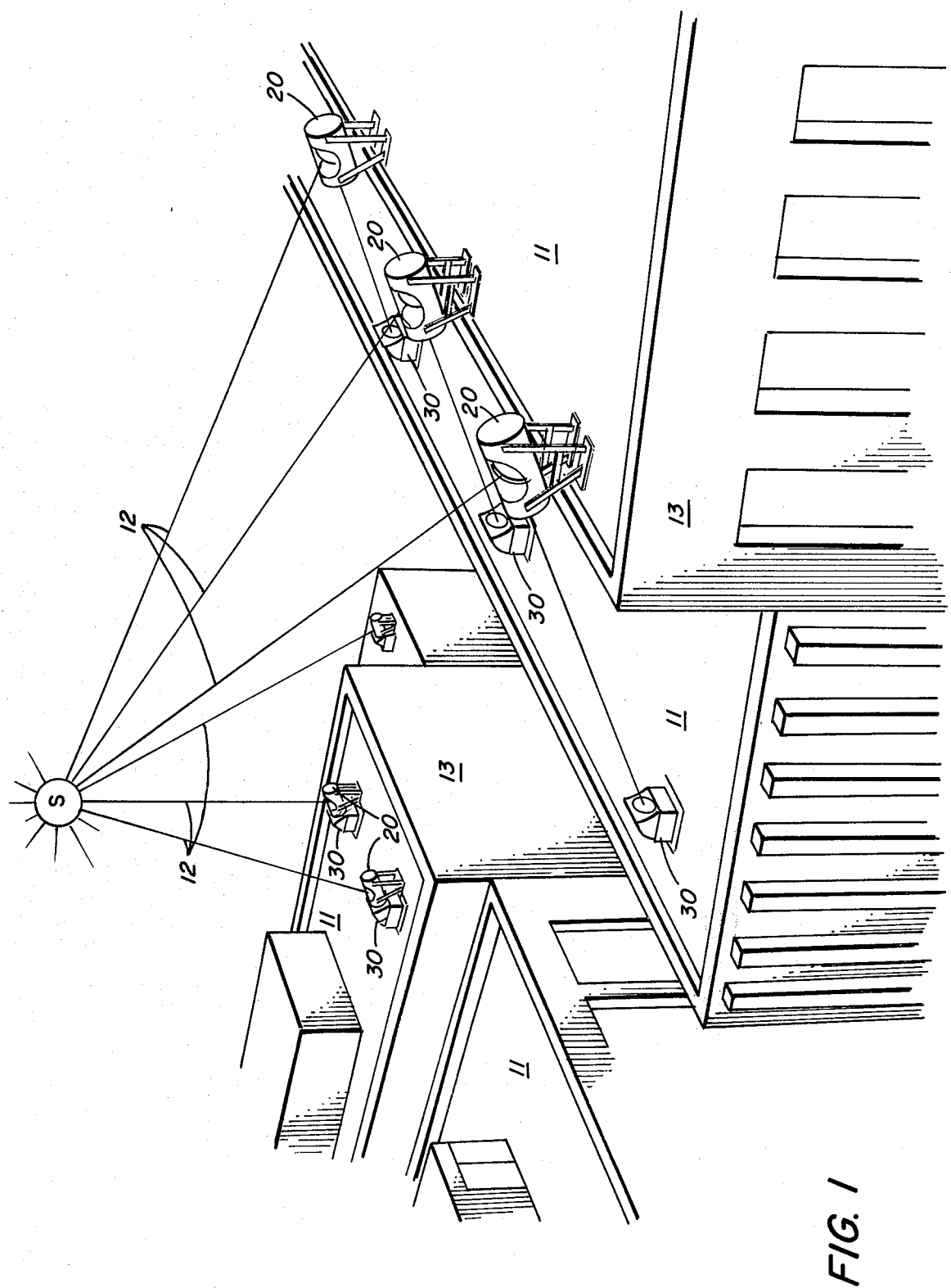
FIG. 1 is a perspective view of the rooftops of associated buildings on which are mounted some of the operative parts of the modular natural lighting system of the invention.
Figure 2:
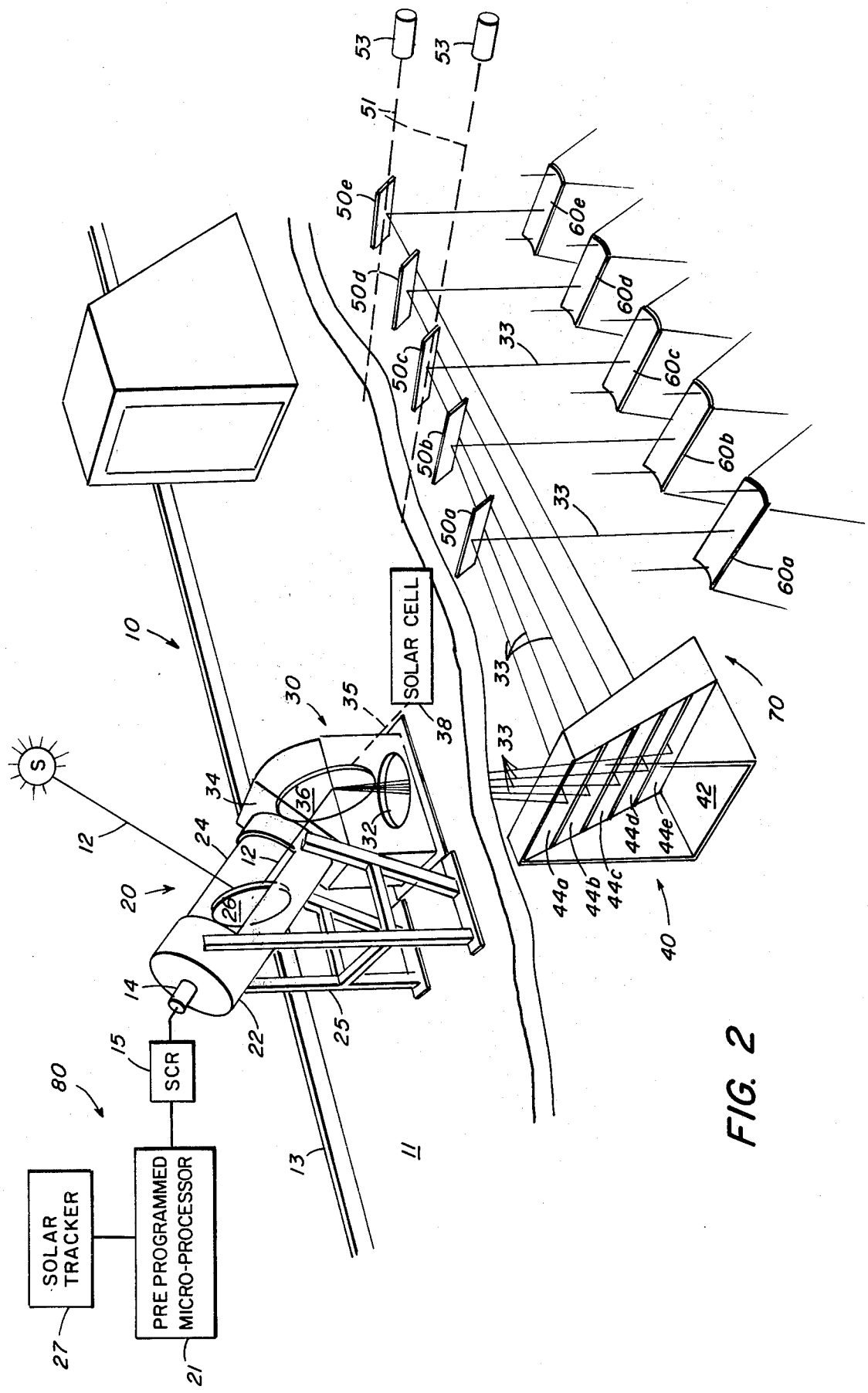
FIG. 2 is a block and schematic diagram, on an enlarged scale, and shows portions of the natural lighting system of the invention.

A preferred embodiment of a modular natural lighting system 10 of the invention is shown in FIGS. 1 and 2. The system 10 includes modules such as a heliostat tracker structure 20, a cold dielectric mirror structure 30, and a distribution system 70. Distribution system 70 includes modules such as a distributor structure 40, a plurality of reflectors 50 and a plurality of output stations 60 that are combined in a configuration which best suits individual applications. The system 10 modules are mounted on existing building structures 13 in a way to minimize loss of light transmitted to various parts of the building, in particular into the deep interior thereof. The heliostat tracker structures 20 gather the sun's rays, including both infrared radiation (IR) 35 and visible solar radiation 33, and transmit the sun's rays to the dielectric mirror structures 30. The dielectric mirror structures 30 transmit only the solar radiation 33 in the visible, cool spectrum thereof; i.e., between 4,000 and 7,000 Angstroms. By employing the modular natural lighting system 10 of the invention, significant reduction in energy consumption is realized by the decreased dependence on artificial illumination. Likewise, the summer cooling load is substantially reduced since the reflected visible rays of the sun produce much less heat than that generated by a fluorescent lamp emitting the same luminous flux.

A plurality of microprocessor controlled heliostat tracker structures 20 are preferably mounted in a weatherproof condition on roofs 11 of buildings 13. Because of the modular design of system 10, as many heliostat tracker structures 20 as may be desired and/or needed to illuminate the interior of the building are mounted on the roof 11 of each building 13. Certain ones of the heliostat tracker structure 20 are mounted in close association with the cold dielectric mirror structures 30, as may be noted on the left-hand side of FIG. 1, as well as shown in FIG. 2. Certain other ones of trackers 20, depending upon the particular structure of the roof 11, are mounted apart from the cold dielectric mirror structures 30, as shown in the right-handed side of FIG. 1. The sun is indicated by (S) and its rays are indicated by the reference character 12.

Referring specifically to FIG. 2, which is a block and schematic diagram, there is shown one heliostat structure 20 in operative combination with cold dielectric mirror structure 30 mounted on top of roof 11 of building 13. The distribution system 70 is shown mounted below the roof 11. An optional solar cell 38, which utilizes transmitted infrared radiation 35 to produce electricity, is shown in block form adjacent the dielectric mirror structure 30. Portions of a drive 80 for the heliostats 20, shown in block form, include a solar tracker 27, a silicon controlled rectifier (SCR) controller 15, and a preprogrammed microprocessor 21.

In the illustrated embodiment, heliostat 20 is a two-axis heliostat, having a longitudinal axis 18 (the polar axis) and a transverse axis 19 (the declination axis). Heliostat 20 is driven by a motor 14 in the longitudinal axis 18 and by an induction motor 14a in the transverse axis 19, the motors 14 and 14a being under the control of the silicon controlled rectifier 15. The two axes 18 and 19 allow the heliostat 20 to track the sun (S) throughout the day in each of the four seasons and at various latitudes. Heliostat 20 is provided with a suitable weatherproof housing 22 and a light weight mirror 26 protected by an entrance window 24 made of a suitable plastic, such as methyl methacrylate. The preprogrammed microprocessor 21, connected to the motors 14 and 14a through the SCR controller 15, is used to control the two-axis drive of the heliostat 20 so that its mirror 26 is constantly receiving rays 12 of the sun (S). In one embodiment, the microprocessor 21 is assisted by the solar tracker 27 so as to provide the fine tuning for the tracking of the sun S. The heliostat tracker structure 20 is built onto a firm support 25 sufficiently secured to the roof 11 so as to withstand the elements, such as high winds, snow and rain.

Figure 6:
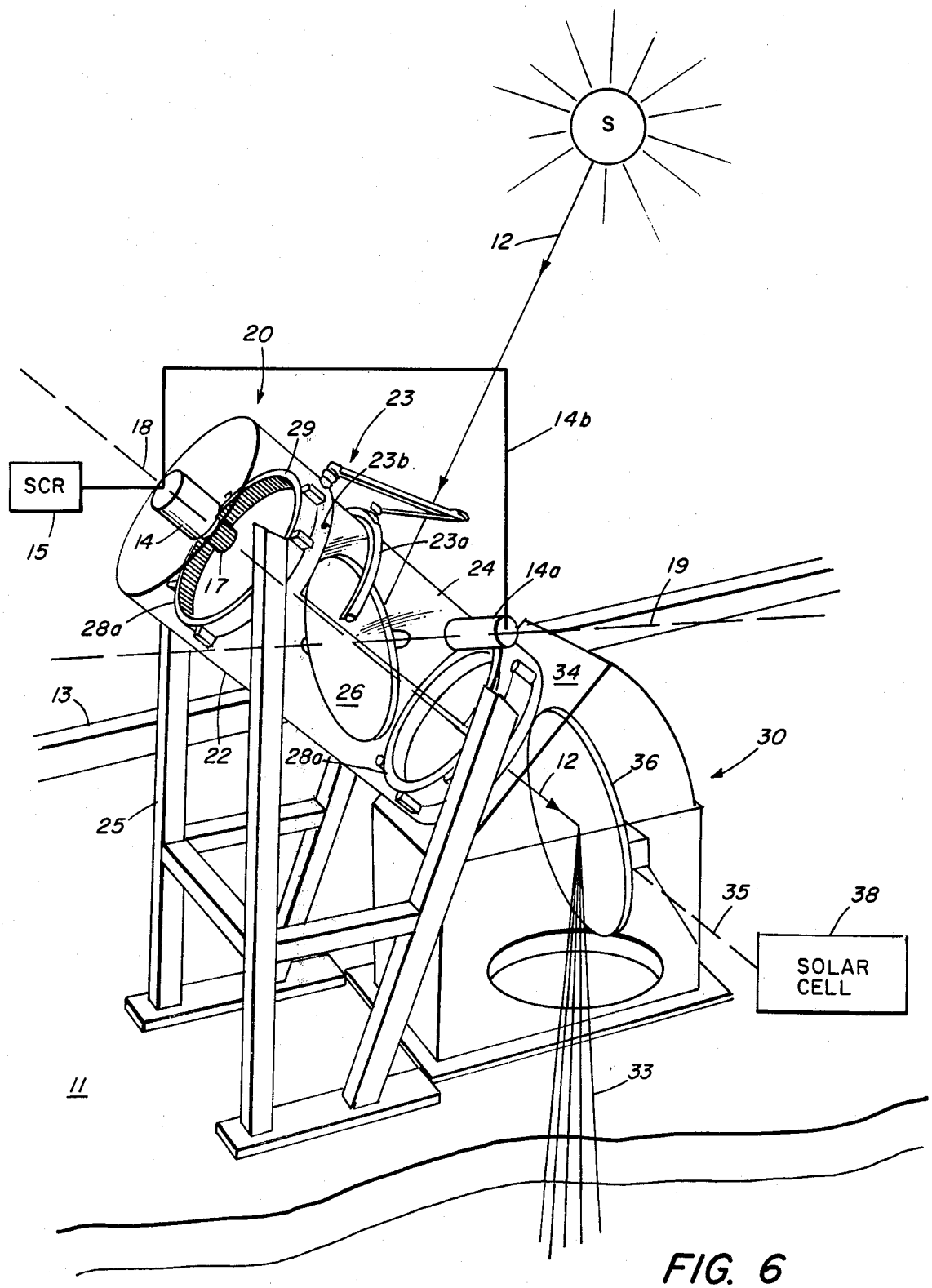
FIG. 6 is a view similar to that shown in FIG. 2 but on a further enlarged scale and shows only portions thereof.

It is preferred that the heliostat 20 is mounted in an equatorial manner, as opposed to a polar manner, so that the smallest sized mirror 26 can be employed. The angular coverage of the heliostat 20 is such that full ±24° sun declination is achieved in the transverse axis 19 and 360° rotation in the longitudinal axis 18. The mirror 26 preferably provides an unobscured beam of light 1.13 meters in diameter, and reflects a one square meter ($m^2$) bundle of light. As may be best observed in FIG. 6, rotation about the longitudinal axis 18 is effected by the motor 14 driving a pinion 17 meshed with an internal arcuate rack 29 formed in an upper gimbal 28a, with a lower gimbal 28b being free-moving. Angular motion of the mirror 26 in the transverse (declination) axis 19 is effected by the second motor 14a drivably connected to the mirror 26 on the one hand and coupled via a lead 14b to the SCR controller 15. A suitable washing and cleaning structure 23 with a wiper 23a and nozzles 23b is provided to clean the entrance window 24. Preferably, structure 23 is powered by solar cell 38.

The cold dielectric mirror structure 30, which is mounted in operative association with the heliostat structure 20, is provided with a dielectric mirror 36. The dielectric mirror 36 receives the rays 12 of the sun (S) from the mirror 26 and reflects therefrom only the visible solar radiation 33, while infrared radiation (IR) 35, shown in FIG. 2, is transmitted through mirror 36.

Figure 7:
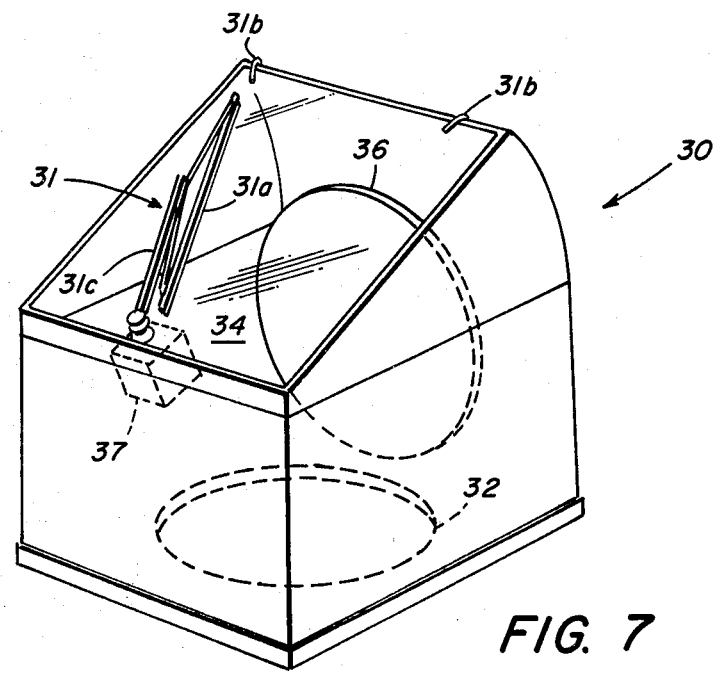
FIG. 7 is a perspective view of yet another modular structure of the natural lighting system of the invention.

The optional solar cell 38 is incorporated in the system 10 so as to provide electricity by employing this transmitted IR solar radiation 35. The reflected visible radiation 33 from the dielectric mirror 36 is admitted into the interior of the building 13 through a suitable aperture 32 cut through the roof 11 and the bottom of the dielectric mirror structure 30. Mirror structure 30 is also shown provided with a transparent faceplate 34 made of a suitable plastic, such as methyl methacrylate. The faceplate 34 is preferably mounted at an angle so as to inhibit the adhering thereto of debris or other dirt that may interfere with the transmission of the sun's rays 12 from mirror 26 to the dielectric mirror 36. A suitable washing and cleaning structure 31 is also preferably provided for faceplate 34, note FIG. 7. Structure 31 comprises a wiper 31a movable over the faceplate 34 by means of an arm 31c powered by a small electric motor 37 mounted just below faceplate 34, and a pair of nozzles 31b. Power for motor 37 is preferably provided by solar cell 38 if one is provided, or from conventional power available in building 13.

The distributor structure 40 is mounted below the aperture 32 formed in the roof 11 in operative association with the dielectric mirror structure 30 so as to receive the reflected cool solar radiation 33 from the dielectric mirror 36. Distributor structure 40 is mounted in a suitable housing 42 and includes a plurality of glass plate mirrors 44a–44e, each of which preferably is independently adjustable about its longitudinal axis 49 by individual drive motors 48, observe FIG. 3. Such independent planar adjustment allows each of the mirrors 44a–44e, which receive portions of the reflected cool radiation 33 from dielectric mirror 36, to focus its respective select portion onto its respective reflector 50a–50e mounted in operative association therewith. The reflectors 50a–50e are preferably aluminized mylar mirrors that are individually adjustable about their respective longitudinal axes 51 by individual drive motors 53 so as to reflect portions of the solar radiation 33 to their respective output stations 60a–60e mounted in operative association therewith. This distribution system 70 comprising distributor 40, reflectors 50a–50e and output stations 60a–60e, can, of course, be organized and arranged both in numbers and locations, to suit the requirements of the particular building, its interior design, the number of floors and the particular natural illumination desired.

Figure 3A:
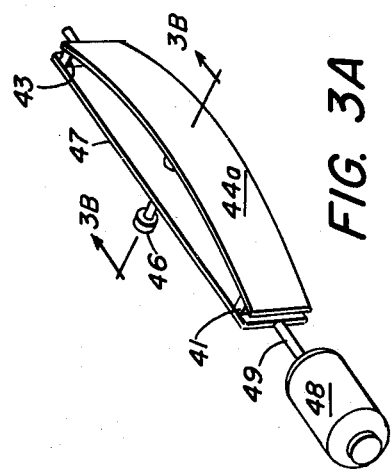
FIG. 3A depicts, on an even more enlarged scale, a portion of the modular structure shown in a convex position.
Figure 3B:
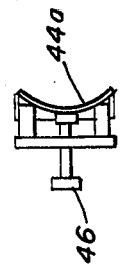
FIG. 3B is a right cross section taken along the lines of 3B—3B of FIG. 3A but showing the modular structure in a concave position.
Figure 3:
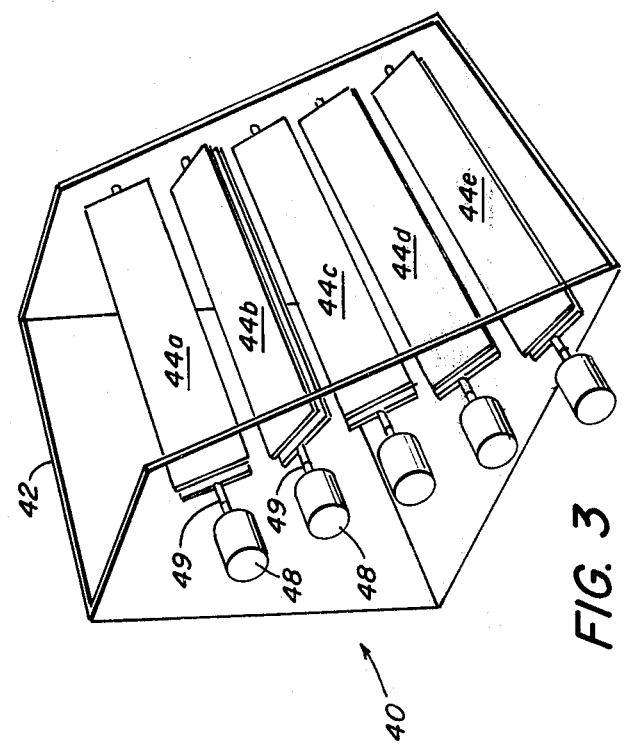
FIG. 3 is a perspective view, on an enlarged scale, of one modular structure of the natural lighting system of the invention.

Referring to FIGS. 3A and 3B, each of these glass plate mirrors 44a–44e, in addition to being planarly adjustable, are mechanically flexed in a direction normal to its longitudinal axis 49. Normally, such mirrors 44a–44e are mounted flat on a suitable backing 47. Here, the respective ends 41 and 43 of a mirror 44a are secured to backing 47, with the flex being effected by a screw 46 admitted through the backing 47 halfway between its ends 41 and 43 so as to bear against the back of the mirror 44a. Mirrors composed of glass plate are preferred because of their flexible characteristics. Rotation of the screw 46 gives the desired flex to the respective mirror 44a–44e. This flex provides added power to focus the visible beam 33 of the sun (S) at the desired location, e.g., at reflectors 50a–50e. The reflectors 50a–50e are also preferably aluminized mylar and constructed in a manner so as to provide a lightweight and efficient reflective surface at relatively low cost.

The output stations 60a–60e provide natural light in the form and direction as required for a particular installation. Potential forms of natural light are of the specular type, or of the specular-diffuse type, or of the diffuse type only. Specular type of natural light is especially desirable in situations where an object, such as a statute 56, is intended to be highlighted by natural light coming from a particular fixed location and direction, as may be noted in FIG. 5. There is shown the cool, reflected light 33 as transmitted from the distributor structure 40 of FIG. 3 and being reflected first by a reflector 52 and then by a second-surface reflector 54, both having the flexibility of being planarly adjustable to suit the individual application. This gives a particularly desirable dynamic characteristic to the specular light directed at the statute 56 so as to give the statute an aesthetic appearance.

Figures 4, 5:
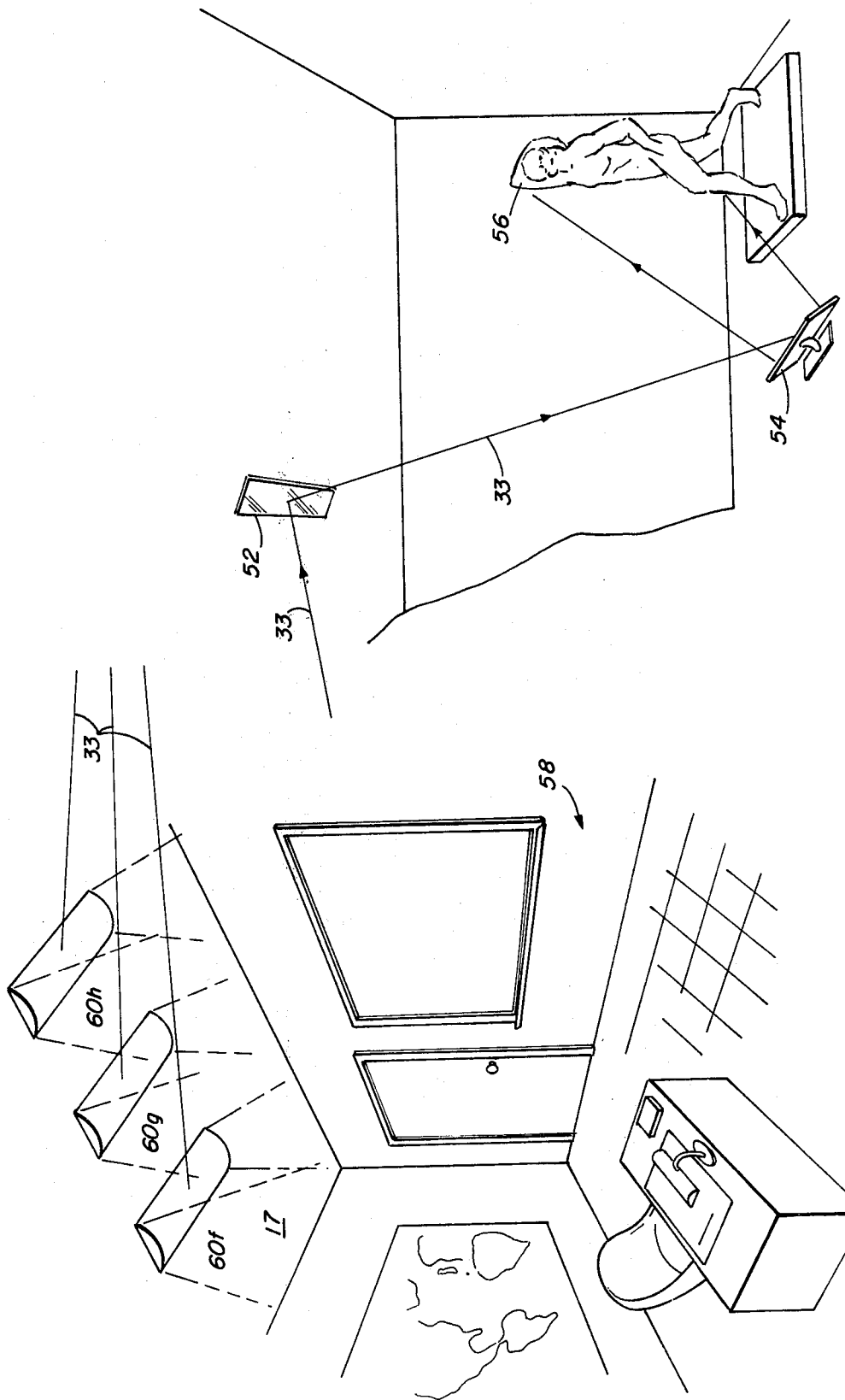
FIG. 4 is a perspective view of a room, and depicts another modular structure of the natural lighting system of the invention.
FIG. 5 is a perspective view of yet another room and shows a further modular design of the system of the invention, illustrating the specular type of natural illumination.

The second type of light—i.e., the specular-diffuse type of light—provides a wider distribution of natural light and is particularly suited for general lighting in office or work areas such as shown in FIG. 4, where a classroom 58 is depicted. Output stations 60f, 60g and 60h shown mounted in a ceiling 17 become an integral part thereof when installed.

Figure 4A:
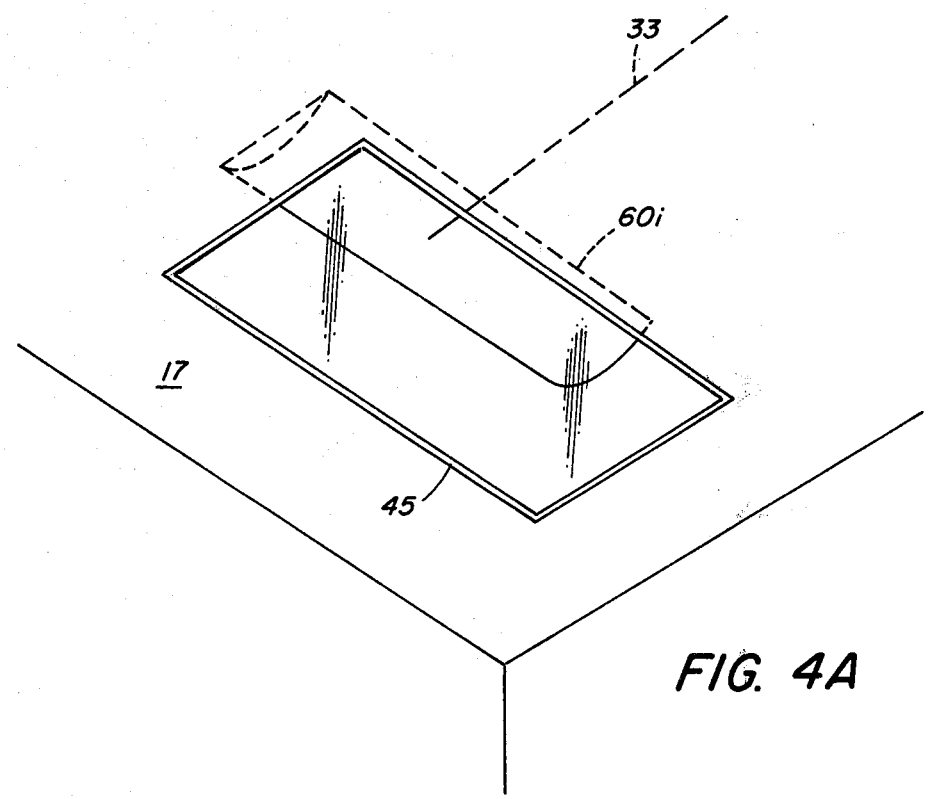
FIG. 4A is a perspective view of a room and shows another modular structure, and illustrates the diffusion type of natural illumination.

The third type of light—namely, the diffuse type of natural illumination—is illustrated in FIG. 4A and involves the use of a translucent plastic or glass sheet 45 incorporated as a fixture in the ceiling 17. Specular light, which is provided by an output station 60i mounted above the translucent sheet 45, is diffused by the sheet 45 so as to give a pleasing illumination and is used in areas, such as rooms with high ceilings, where the specular-diffuse station shown and described with reference to FIG. 4 may be less suitable.

There are many applications for the modular natural lighting system 10 of the invention, and only an architect's imagination sets the limit thereto, together with the particular type of building in which it is employed. The system 10 is used to direct cool natural light into an otherwise unlit interior to supply dramatic effects. The system 10 is used in museums to illuminate are works, such as statutes or pictures, so as to provide a dynamic viewing state desirable in such instances. Natural light is also used in manufacturing and office areas where it is currently unavailable. Residential homes, built with less window area so as to contain the heat within or permit less heat to radiate therefrom, can be provided with natural light by the system 10 in most of their interior. Due to its modular construction, the system 10 of the invention adapts itself for easy installation.

Consequently, a modular natural lighting system has been described that is energy-efficient in that it provides natural lighting with minimum losses and with effective control, so as to distribute natural light of the desired type throughout a building, and yet not burden its energy load. Because it is of modular design, the system 10 is installed as needed so as to suit a particular building and its location. Due to the materials the system 10 uses, such as plastic, acrylic or polystyrene for the output stations 60, the costs thereof are kept relatively low, and yet providing high durability for a number of years so as to return its cost to the owner many times.

Since certain changes may be made in the present disclosure, it is intended that all matter described in the foregoing specification and shown in the accompanying drawings, be interpreted in an illustrative, and not in a limiting sense.

What is claimed is:

1. A modular natural lighting system comprising:
   (a) a microprocessor-controlled heliostat tracker structure equatorially mounted on the roof of a building to track the sun;
   (b) a cold dielectric mirror structure mounted on said roof in operative association with said heliostat tracker structure to receive the sun's rays reflected therefrom in a manner so as to reflect only the visible solar radiation thereof;
   (c) an aperture provided in both said cold dielectric mirror structure and said roof;
   (d) a distributor structure, including at least one glass plate mirror configured to be planarly adjustable, said structure operatively mounted below said aperture so as to receive said reflected visible solar radiation from said cold dielectric mirror structure and reflect and focus selective portions thereof;
   (e) a plurality of reflectors mounted throughout said building, each of which is designed to receive a selective portion of said visible solar radiation reflected by said distributor structure; and
   (f) a plurality of output stations mounted throughout said building in operative association with said plurality of reflectors and designed to receive portions of said visible solar radiation reflected by said plurality of reflectors and to provide natural illumination in selected areas of said building.

2. The modular natural lighting system of claim 1 wherein said microprocessor controlled heliostat tracker structure is driven with the aid of a solar tracker and a silicon controlled rectifier and is provided with an entrance window.

3. The modular natural light system of claim 2 wherein said heliostat tracker structure is a two-axis structure driven by a motor under the control of said silicon controlled rectifier.

4. The modular natural lighting system of claim 1 including a solar cell operatively mounted adjacent said cold dielectric mirror structure to utilize the infrared portion of the solar radiation transmitted by said mirror structure to generate electricity therefrom.

5. The modular natural lighting system of claim 1 wherein said glass plate mirror is designed for mechanical flex in a direction normal to its longitudinal axis to introduce power into the system.

6. The modular natural lighting system of claim 1 wherein said plurality of reflectors are each light weight and low cost.

7. The modular natural lighting system of claim 1 wherein said plurality of output stations are characterized in that some of said stations provide natural illumination of the specular type, some others of the specular-diffuse type, and still others of the diffuse type only.

8. The modular natural lighting system of claim 1 wherein some of said plurality of output stations become an integral part of a suspended ceiling in said building when installed.

9. A natural lighting system comprising:

(a) a heliostat mounted on the roof of a building, said heliostat configured to track the sun and to reflect both IR and visible radiation of the sun's rays;

(b) a cold dielectric mirror structure mounted on said roof in operative association with said heliostat to receive the sun's rays reflected by said heliostat, said dielectric mirror structure operative to reflect only said visible solar radiation (c) an aperture provided in the bottom of said dielectric mirror structure and in the portion of said roof underlying said dielectric mirror structure, said visible solar radiation reflected by said dielectric mirror structure through said aperture into said building;

(d) a distributor structure, having at least one glass plate mirror, mounted in said building below said aperture to receive said visible solar radiation reflected from said dielectric mirror structure and reflect selective portions thereof;

(e) said glass plate mirror configured to be planarly adjustable about its longitudinal axis;

(f) a first driver operatively coupled to said glass plate mirror to effect said planar adjustment thereof;

(g) a reflector mounted in operative association with said glass plate mirror, said reflector to receive selective portion of said visible solar radiation reflected from said glass plate mirror, said reflector configured to be planarly adjustable about its longitudinal axis;

(h) a second driver operatively coupled to said reflector to effect said planar adjustment thereof; and (i) an output station mounted in operative association with said reflector, said output station configured to receive said selective portion of said visible solar radiation reflected by said reflector and to provide natural illumination in a selected area of said building.

10. The natural lighting system of claim 9 wherein said glass plate mirror is designed for mechanical flex in a direction normal to its said longitudinal axis.

* * * * *